United States Patent
Okerman

(10) Patent No.: US 10,395,875 B2
(45) Date of Patent: Aug. 27, 2019

(54) CIRCUIT BREAKER PANEL INCLUDING REMOTELY OPERATED CIRCUIT BREAKER

(71) Applicant: EATON CORPORATION, Cleveland, OH (US)

(72) Inventor: Jason Kohei Arthur Okerman, Hudson, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 1155 days.

(21) Appl. No.: 14/561,589

(22) Filed: Dec. 5, 2014

(65) Prior Publication Data
US 2016/0163476 A1 Jun. 9, 2016

(51) Int. Cl.
| | |
|---|---|
| *H01H 9/54* | (2006.01) |
| *H01H 71/46* | (2006.01) |
| *H01H 71/12* | (2006.01) |
| *H01H 83/20* | (2006.01) |
| *H02B 1/32* | (2006.01) |

(52) U.S. Cl.
CPC .............. *H01H 83/20* (2013.01); *H01H 9/54* (2013.01); *H01H 71/46* (2013.01); *H02B 1/32* (2013.01); *H01H 71/123* (2013.01)

(58) Field of Classification Search
CPC .... H01H 9/54; H01H 89/06–10; H01H 71/46; H01H 2231/032; H01H 2085/466; H01H 89/10
See application file for complete search history.

(56) References Cited

U.S. PATENT DOCUMENTS

| 6,507,255 | B1 | 1/2003 | Ennis et al. | |
|---|---|---|---|---|
| 7,885,043 | B2 * | 2/2011 | Kumfer | H02H 7/261 361/2 |
| 2008/0012665 | A1 * | 1/2008 | DeBoer | H01H 1/54 335/16 |
| 2010/0164744 | A1 * | 7/2010 | Parker | H04B 10/802 340/12.22 |
| 2015/0326001 | A1 * | 11/2015 | Emerson | H02H 1/0092 361/93.2 |

OTHER PUBLICATIONS

"Understanding CAN Bus Messages". <https://www.kvaser.com/aboutcan/thecanprotocol/canmessages33/>. Accessed Jul. 6, 2017.*
AU 2012905447. Dec. 13, 2012. Priority document of US 2015/0326001.*

* cited by examiner

*Primary Examiner* — Ronald W Leja
*Assistant Examiner* — Christopher J Clark
(74) *Attorney, Agent, or Firm* — Eckert Seamans Cherin & Mellott, LLC

(57) ABSTRACT

A circuit breaker panel includes a control unit structured to generate a control signal and a number of circuit breakers. At least one of the circuit breakers includes a number of sets of separable contacts and is structured to open or close one set of separable contacts based on the control signal. At least one of the circuit breakers is structured to electrically connect between a line and load and includes a power supply structured to convert power from the line and to use the converted power to open or close the set of separable contacts.

18 Claims, 8 Drawing Sheets

CIRCUIT BREAKER PANEL INCLUDING REMOTELY OPERATED CIRCUIT BREAKER

CROSS-REFERENCE TO RELATED APPLICATION

This application is related to co-pending U.S. patent application Ser. No. 14/561,586 filed on Dec. 5, 2014, entitled "CIRCUIT BREAKER INCLUDING REMOTE OPERATION CIRCUIT", the entirety of which is incorporated herein by reference.

BACKGROUND

Field

The disclosed concept relates generally to circuit breakers panels, and in particular, to circuit breaker panels including remotely operated circuit breakers.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Some circuit breakers also provide for remote operation such as controlling the circuit breaker to open or close its separable contacts in response to an external control signal. The remotely operated circuit breakers have included a second operating mechanism which is remotely operated to open the separable contacts or a secondary set of separable contacts. The remotely operated circuit breakers have used external power provided on a dedicated circuit to power the remote operating mechanisms. However, this arrangement increases the cost and maintenance time of circuit breaker panels including such remotely operated circuit breakers.

There is room for improvement in circuit breakers.

There is also room for improvement in circuit breaker panels.

SUMMARY

These needs and others are met by embodiments of the disclosed concept in which a circuit breaker panels includes a number of remotely operated circuit breakers, at least one of which includes a power supply structured to convert power from a protected circuit to power opening or closing of separable contacts.

In accordance with one aspect of the disclosed concept, a circuit breaker panel comprises: a control unit structured to generate a control signal; and a number of circuit breakers, wherein at least one of the circuit breakers includes a number of sets of separable contacts and is structured to open or close one set of separable contacts based on the control signal, and wherein the at least one of the circuit breakers is structured to electrically connect between a line and load and includes a power supply structured to convert power from the line and to use the converted power to open or close the set of separable contacts.

In accordance with another aspect of the disclosed concept, a circuit breaker panel comprises: a control unit structured to generate a control signal; and a number of circuit breakers, wherein at least one of the circuit breakers includes a number of sets of separable contacts and is structured to receive the control signal, and wherein the at least one of the circuit breakers includes a processor structured to determine whether one or more conditions are met in response to the at least one of the circuit breakers receiving the control signal and to control the one of the sets of separable contacts to open or close if one or more conditions are met.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
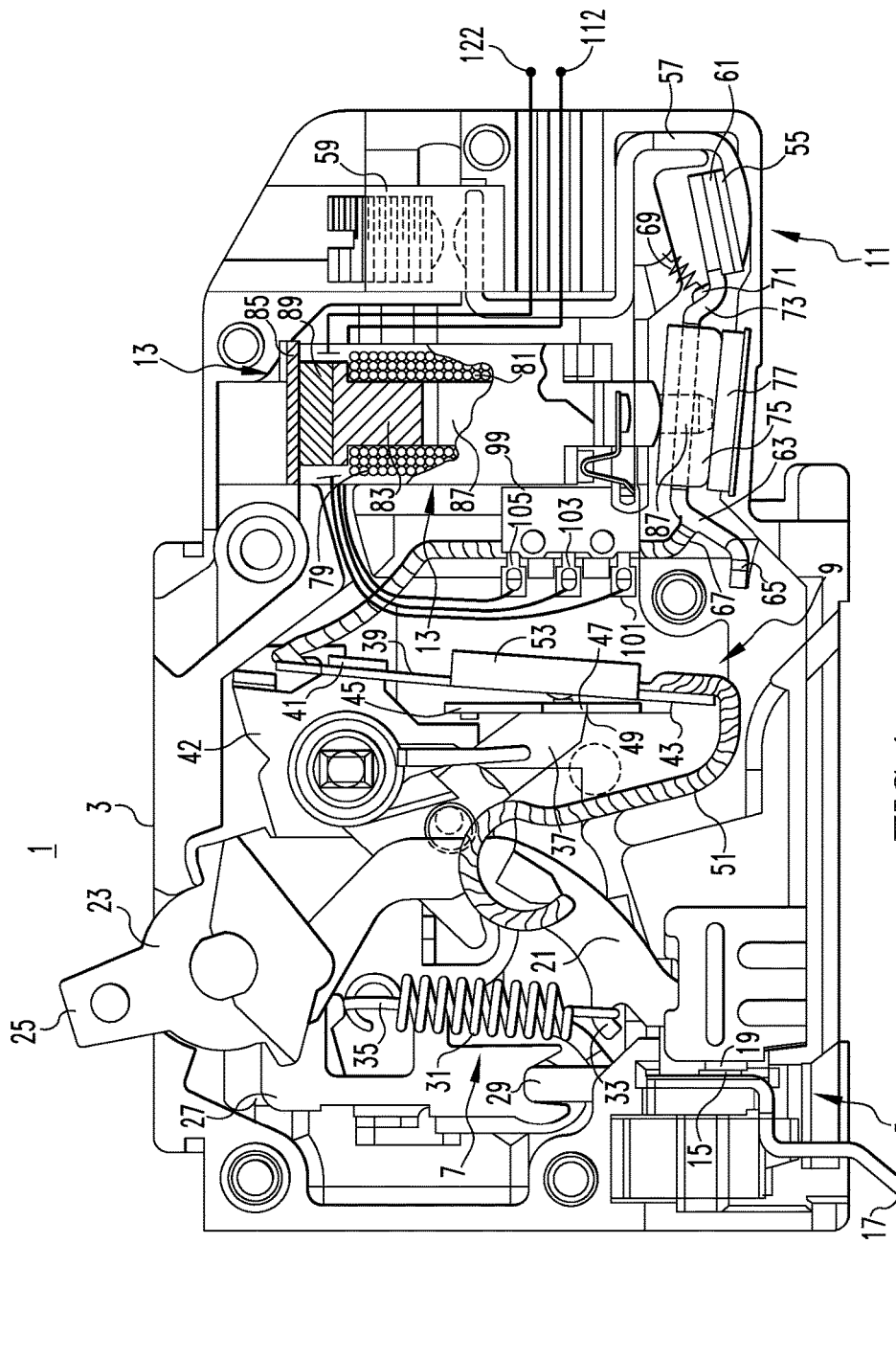
FIG. 1 is a schematic diagram of a conventional remotely operated circuit breaker.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

As employed herein, the statement that the edge of a circuit breaker and the edge of a circuit breaker panel are substantially adjacent shall mean that the gutter space that is conventionally included between the edge of a circuit breaker and the edge of a circuit breaker panel has been substantially removed.

A conventional remotely operated circuit breaker 1 is shown in FIG. 1. The circuit breaker 1 includes a molded housing 3 and is shown with the cover of the housing removed. The basic components of the circuit breaker 1 are a set of main contacts 5, an operating mechanism 7 for opening the set of main contacts 5, and a thermal-magnetic trip device 9 which actuates the operating mechanism 7 to trip the set of main contacts 5 open in response to certain overcurrent or short circuit conditions. Further included are a set of secondary contacts 11 and an actuator in the form of an exemplary magnetically latchable solenoid 13 which is remotely controllable to control the open and closed states of the set of secondary contacts 11.

The set of main contacts 5 includes a fixed contact 15 secured to a line terminal 17 and a moveable main contact 19 which is affixed to an arcuate contact arm 21 which forms part of the operating mechanism 7. The operating mechanism 7 includes a pivotally mounted operator 23 with an integrally molded handle 25. The operating mechanism 7 also includes a cradle 27 pivotally mounted on a support 29 molded in the housing. With the handle 25 in the closed position, as shown in FIG. 1, a spring 31 connected to a hook 33 on the contact arm 21 and a tab 35 on the cradle 27 holds the main contacts 5 closed. The spring 31 also applies a force with the set of main contacts 5 closed, as shown, to the cradle 27 which tends to rotate the cradle in a clockwise direction about the support 29. However, the cradle 27 has a finger 37, which is engaged by the thermal-magnetic trip device 9 to prevent this clockwise rotation of the cradle under normal operating conditions.

The thermal-magnetic trip device 9 includes an elongated bimetal 39 which is fixed at its upper end to a tab 41 on the metal frame 42 seated in the molded housing 3. Attached to the lower, free end of the bimetal 39 by a lead spring 43 is an armature 45. The armature 45 has an opening 47, which is engaged by a latching surface 49 on the finger 37.

The free end of the bimetal 39 is connected to the contact arm 21 by a flexible braided conductor 51 in order that the load current of the circuit protected by the circuit breaker 1 passes through the bimetal. A persistent overcurrent heats the bimetal 39, which causes the lower end thereof to move to the right. If this overcurrent is of sufficient magnitude and duration, the latching surface 49 on the finger 37 is pulled out of engagement with the armature 45. This allows the cradle 27 to be rotated clockwise by the spring 31. The clockwise rotation of the cradle 27 moves the upper pivot point for the contact arm 21 across the line of force of the spring 31 in order that the contact arm is rotated counterclockwise, to open the set of main contacts 5, as is well understood. This also results in the handle 25 rotating to an intermediate position (not shown) to indicate the tripped condition of the set of main contacts 5.

In addition to the armature 45, a magnetic yoke 53 is supported by the bimetal 39. Very high overcurrents, such as those associated with a short circuit, produce a magnetic field which draws the armature 45 to the magnetic yoke 53, thereby also releasing the cradle 27 and tripping the set of main contacts 5 open. Following either trip, the main set of contacts 5 are reclosed by moving the handle 25 fully clockwise, which rotates the cradle 27 counterclockwise until the finger 37 relatches in the opening 47 in the armature 45. Upon release of the handle 25, it moves counterclockwise slightly from the full clockwise position and remains there. With the cradle relatched, the line of force of the spring 31 is reestablished to rotate the contact arm 21 clockwise to close the set of main contacts 5 when the handle 25 is rotated fully counterclockwise.

The set of secondary contacts 11 includes a fixed secondary contact 55 which is secured on a load conductor 57 that leads to a load terminal 59. The set of secondary contacts 11 also includes a moveable secondary contact 61 which is fixed to a secondary contact arm 63 that at its opposite end is seated in a molded pocket 65 in the molded housing 3. The secondary contact arm 63 is electrically connected in series with the set of main contacts 5 by a second flexible braided conductor 67 connected to the fixed end of the bimetal 39. Thus, a circuit or load current is established from the line terminal 17 through the set of main contacts 5, the contact arm 21, the flexible braided conductor 51, the bimetal 39, the second flexible braided conductor 67, the secondary contact arm 63, the set of secondary contacts 11, and the load conductor 57 to the load terminal 59.

The set of secondary contacts 11 is biased to the closed state shown in FIG. 1 by a helical compression spring 69 seated on a projection 71 on an offset 73 in the secondary contact arm 63. The spring 69 is oriented such that the force that it applies to the secondary contact arm 63 tending to close the set of secondary contacts is relaxed to a degree with the set of secondary contacts 11 in the open position. This serves the dual purpose of providing the force needed to close the set of secondary contacts 11 against rated current in the protected circuit and also reducing the force that must be generated by the magnetically latching solenoid 13 to hold the set of secondary contacts in the open state. In order for the set of secondary contacts 11 to withstand short circuit currents and allow the set of main contacts 5 to perform the interruption, the magnet force generated by the short circuit current causes an armature 75 mounted on the secondary contact arm 63 to be attracted to a pole piece 77 seated in the molded housing 3 thereby clamping the secondary contacts closed.

As shown by the partial section in FIG. 1, the actuator/solenoid 13 includes an open/close coil 79,81 wound on a steel core 83 supported by a steel frame 85. A plunger 87 moves rectilinearly within the coil 79,81. A permanent magnet 89 is seated between the steel core 83 and the steel frame 85. To operate the coil 79,81, when the plunger 87 is not seated against the core 83 and a magnetic field is induced by applying a suitable voltage to the windings of the coil 79,81, the core 83 and the plunger 87 then attract magnetically, pulling the plunger 87 against the core 83. The magnet 89 then holds the plunger 87 against the core 83 without an induced electrical field. To release the plunger 87 from the core 83, an opposite flux field is induced in the coil windings by applying an opposite polarity voltage thereto. When the opposite field is applied, the magnetic field from the permanent magnet 89 is zeroed out or decreased to the point where a light axial load is capable of pulling the plunger 87 away from the core 83.

The plunger 87 engages the secondary contact arm 63. When the open/close coil 79,81 is energized with a close polarity signal (e.g., a negative voltage in the exemplary embodiment), a magnetic field is produced which drives the plunger 87 downward to a first position which rotates the secondary contact arm 63 clockwise and thereby moves the set of secondary contacts 11 to the closed state. The secondary contacts 11 are maintained in the closed state by the spring 69.

When it is desired to open the set of secondary contacts 11, the open/close coil 79,81 is energized with an open polarity signal (e.g., a positive voltage in the exemplary embodiment), which lifts the plunger 87 and with it the secondary contact arm 63 to a second position which opens the set of secondary contacts 11. With the plunger 87 in the full upward position, it contacts the steel core 83 and is retained in this second position by the permanent magnet 89. Subsequently, when the open/close coil 79,81 is again energized with the close polarity signal, the magnetic field generated is stronger than the field generated by the permanent magnet 89 and, therefore, overrides the latter and moves the plunger 87 back to the first, or closed position.

The open/close coil 79,81 of the magnetically latching solenoid 13 is remotely controlled via terminals 112 and 122 and microswitch 99, which has a common terminal 101 and first and second switched terminals 103,105. AC or DC power signals are received through in the circuit breaker 1 via terminals 112 and 122 and are used to operate the solenoid 13 to open or close the secondary contacts. More specifically, the AC or DC power signals received via terminals 112 and 122 provide both control and power for operating the solenoid 13. Thus, the wiring connected to terminals 112 and 122 must be sufficient to carry the power to operate the solenoid 13.

Figure 2:
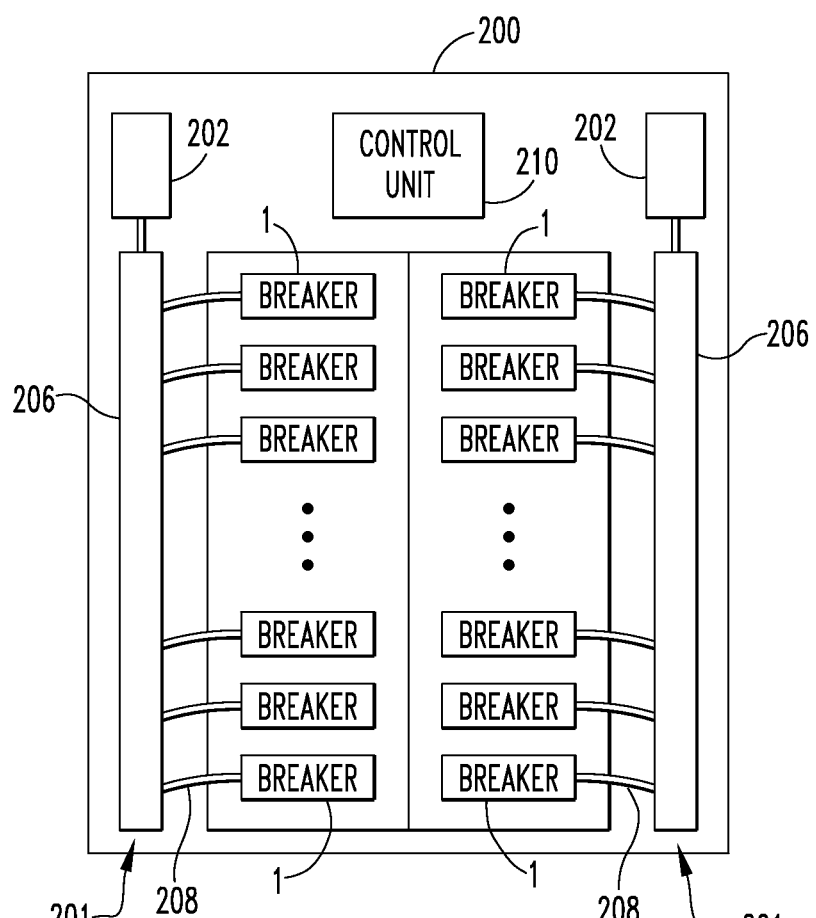
FIG. 2 is a schematic diagram of a conventional circuit breaker panel.

FIG. 2 is a schematic diagram of a circuit breaker panel 200 employing a number of the circuit breakers 1 of FIG. 1. The panel 200 includes two columns of circuit breakers 1. Between the edge of a column of circuit breakers 1 and an outside edge of the panel 200 is a gutter space 201. In the panel 200 of FIG. 2, a control bus 206 is located in the gutter space 201. The control bus 206 provides power signals to the circuit breakers 1 via power connections 208 corresponding to each circuit breaker 1.

The panel 200 also includes power converters 202 electrically connected to the control busses 206. The power converters 202 convert power provided to the panel 200 (e.g., line power) to a level that is suitable to control and power the solenoids 13 in the circuit breakers 1. The panel further includes a control unit 210 which controls operations of the panel such as controlling the output of signals to operate the solenoids 13 in the circuit breakers 1.

Providing dedicated power converters 202 and control busses 206 to operate the solenoids in the circuit breakers 1 adds to the cost and size of the panel 200. Additionally, electrically connecting each circuit breaker 1 to the control busses 206 via power connections 208 is a time consuming process.

Figure 3:
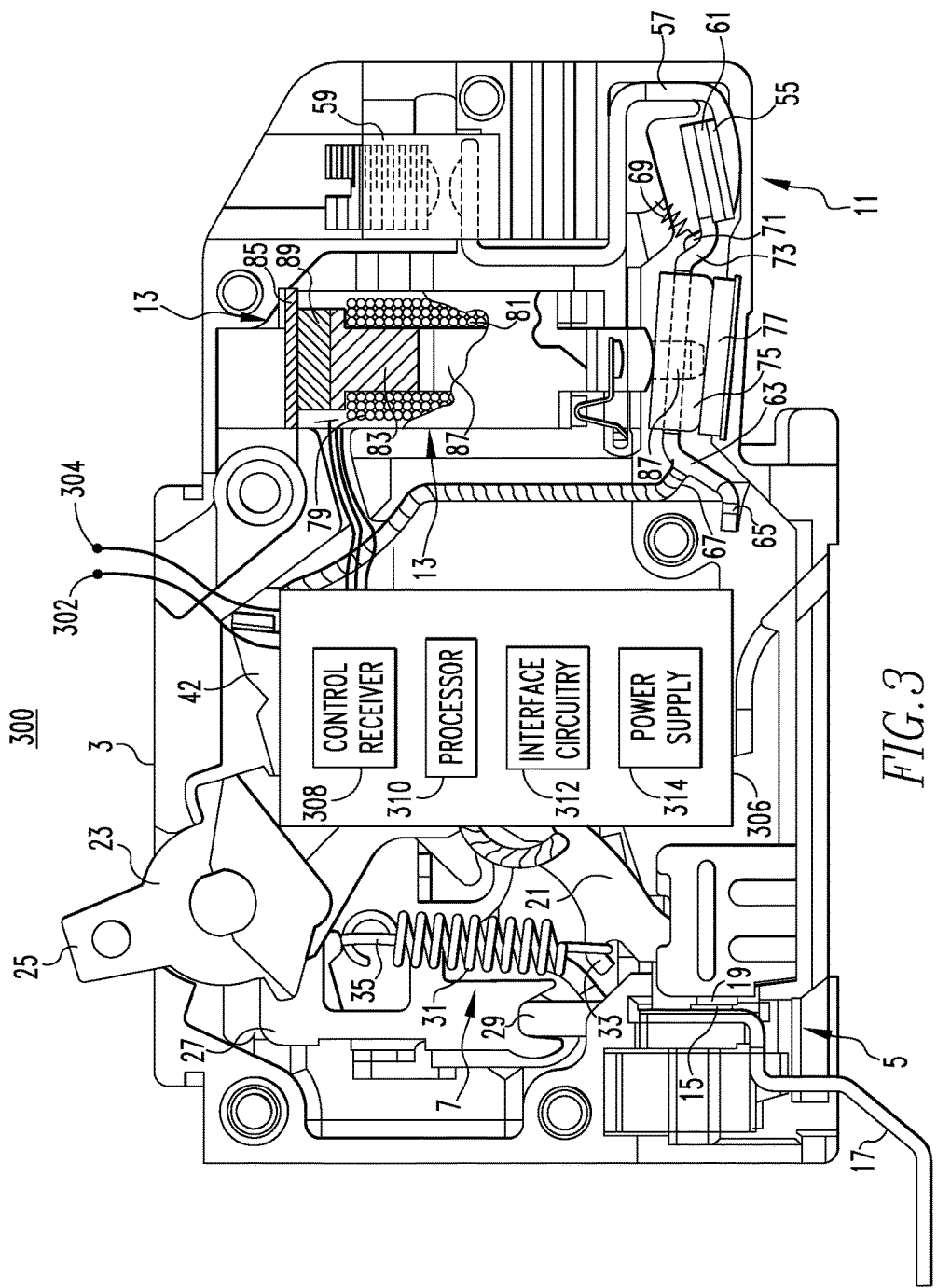
FIGS. 3-5 are partial schematic diagrams of circuit breakers in accordance with example embodiments of the disclosed concept.

Referring to FIG. 3, a circuit breaker 300 in accordance with an example embodiment of the disclosed concept is shown. The circuit breaker 300 includes the line terminal 17 structured to electrically connect to line power and the load terminal 59 which is structured to electrically connect to a load (not shown). The circuit breaker 300 of FIG. 3, like the circuit breaker 1 of FIG. 1, includes the solenoid 13 which is operable to open or close secondary contacts 11. However, rather than receiving power signals via terminals 112 and 122, the circuit breaker 300 of FIG. 3 includes terminals 302 and 304 which are structured to receive control signals. The control signal may be an AC signal (e.g., without limitation, a 24 $V_{RMS}$ signal) or a DC signal (e.g., without limitation, a 24V signal, a 5V signal, a 3.3V signal, etc.). The control signals may also be any suitable analog or digital electrical signal. It is also contemplated that the control signal may be modulated in any suitable manner to communicate and/or carry information.

Terminals 302 and 304 are electrically connected to a remote operation circuit 306. The remote operation circuit 306 includes a control receiver circuit 308, a processor 310, interface circuitry 312, and a power supply 314.

The control receiver circuit 308 is structured to receive the control signals from terminals 302 and 304. It is also contemplated that the control receiver circuit 308 may provide any signal processing (e.g., without limitation, filtering; level adjusting; etc.) to put the control signal is suitable form for the processor 310.

The processor 310 is structured to receive the control signal from the control receiver circuit 308 and to determine operation of the solenoid 13 based on the control signal. The processor 310 outputs a signal to the interface circuitry 312. Based on the signal from the processor 310, the interface circuitry 312 causes the solenoid 13 to operate to open or close the separable contacts 11 using power from the power supply 314.

In some embodiments of the disclosed concept, the processor 310 is also structured to determine whether one or more conditions are met and to only output the signal to the interface circuitry 312 to cause the solenoid 13 to operate to open or close when the one or more conditions are met. In one example embodiment, the circuit breaker 300 has associated identification information and the processor 310 only outputs the signal when the control signal also includes the identification information 300 of the circuit breaker. In this manner, one control signal can be used to open solenoids 13 on a selected circuit breaker or group of circuit breakers. In another example embodiment, the one or more conditions are based on characteristics such as, without limitation, a current between the line and the load, a voltage between the line and a neutral, and a type of the circuit breaker (e.g., without limitation, a lighting circuit breaker). With these types of conditions, the circuit breaker 300 uses a degree of logic to determine whether to trip, rather than always tripping in response to a control signal.

The power supply 314 is electrically connected to the conductive path between the line terminal 17 and the load terminal 59. The power supply 314 is structured to convert power flowing between the line and load terminals 17 and 59 (e.g., without limitation the line power) to a suitable level and form for use in operating the solenoid 13. The power supply 314 provides this power to the interface circuitry 312 for use in operating the solenoid 13.

Since the terminals 302 and 304 receive control signals rather than power signals, the gauge of wires carrying the control signal to the terminals 302 and 304 may be less than that of wires intended to carry power signals. Additionally, the control signals may be used to selectively control specific circuit breakers or groups of circuit breakers.

Figure 4:
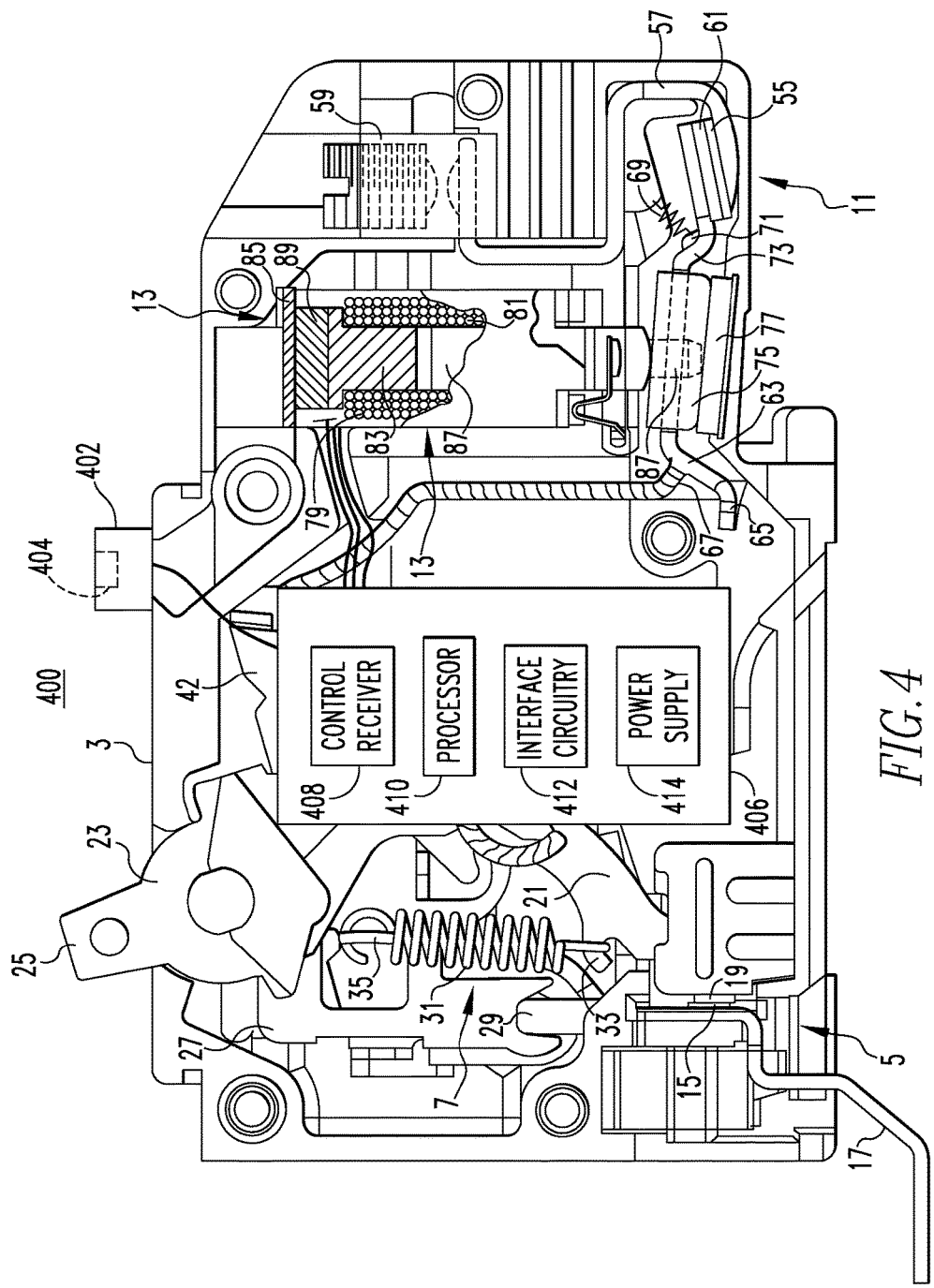

Referring to FIG. 4, a circuit breaker 400 in accordance with another example embodiment of the disclosed concept is shown. The circuit breaker 400 includes the line terminal 17 structured to electrically connect to line power and the load terminal 59 which is structured to electrically connect to a load (not shown). The circuit breaker 400 of FIG. 4, like the circuit breaker 1 of FIG. 1, includes the solenoid 13 which is operable to open or close secondary contacts 11. However, rather than receiving power signals via terminals 112 and 122, the circuit breaker 400 of FIG. 4 includes an optical receiver 402 including an optical sensor 404. The optical receiver 402 and optical sensor 404 are structured to receive an optical control signal. The optical control signal may be any suitable optical signal (e.g., without limitation, an infrared signal). It is also contemplated that the optical control signal may be modulated in any suitable manner to communicate and/or carry information. The optical receiver 402 is structured to convert the optical control signal to an electric control signal.

The optical receiver 402 is electrically connected to a remote operation circuit 406. The remote operation circuit 406 includes a control receiver circuit 408, a processor 410, interface circuitry 412, and a power supply 414.

The control receiver circuit 408 is structured to receive the electric control signal from the optical receiver 402. It is also contemplated that the control receiver circuit 408 may provide any signal processing (e.g., without limitation, filtering; level adjusting; etc.) to put the electric control signal is suitable form for the processor 410.

The processor 410 is structured to receive the electric control signal from the control receiver circuit 408 and to determine operation of the solenoid 13 based on the electric control signal. The processor 410 outputs a signal to the interface circuitry 412. Based on the signal from the processor 410, the interface circuitry 412 causes the solenoid 13 to operate to open or close the separable contacts 11 using power from the power supply 414.

In some embodiments of the disclosed concept, the processor 410 is also structured to determine whether one or more conditions are met and to only output the signal to the interface circuitry 412 to cause the solenoid 13 to operate to open or close when the one or more conditions are met. In one example embodiment, the circuit breaker 400 has associated identification information and the processor 410 only outputs the signal when the control signal also includes the identification information 400 of the circuit breaker. In this manner, one control signal can be used to open solenoids 13 on a selected circuit breaker or group of circuit breakers. In another example embodiment, the one or more conditions are based on characteristics such as, without limitation, a current between the line and the load, a voltage between the line and a neutral, and a type of the circuit breaker (e.g., without limitation, a lighting circuit breaker). With these types of conditions, the circuit breaker 400 uses a degree of logic to determine whether to trip, rather than always tripping in response to a control signal.

The power supply 414 is electrically connected to the conductive path between the line terminal 17 and the load terminal 59. The power supply 414 is structured to convert power flowing between the line and load terminals 17 and 59 (e.g., without limitation, the line power) to a suitable level and form for use in operating the solenoid 13. The power supply 414 provides this power to the interface circuitry 412 for use in operating the solenoid 13.

The optical control signals may be communicated to the circuit breaker in any suitable manner. For example and without limitation, the optical control signals may be communicated to the circuit breaker 400 by a fiber optic cable that passes within the vicinity of the optical receiver 402. It is also contemplated that a light bar may be employed. A single light bar can communicate optical control signals to multiple vertically or horizontally aligned circuit breakers 400. Additionally, installing a single light bar corresponding to multiple circuit breakers 400 is quicker than individually connecting wires to multiple circuit breakers.

Figure 5:
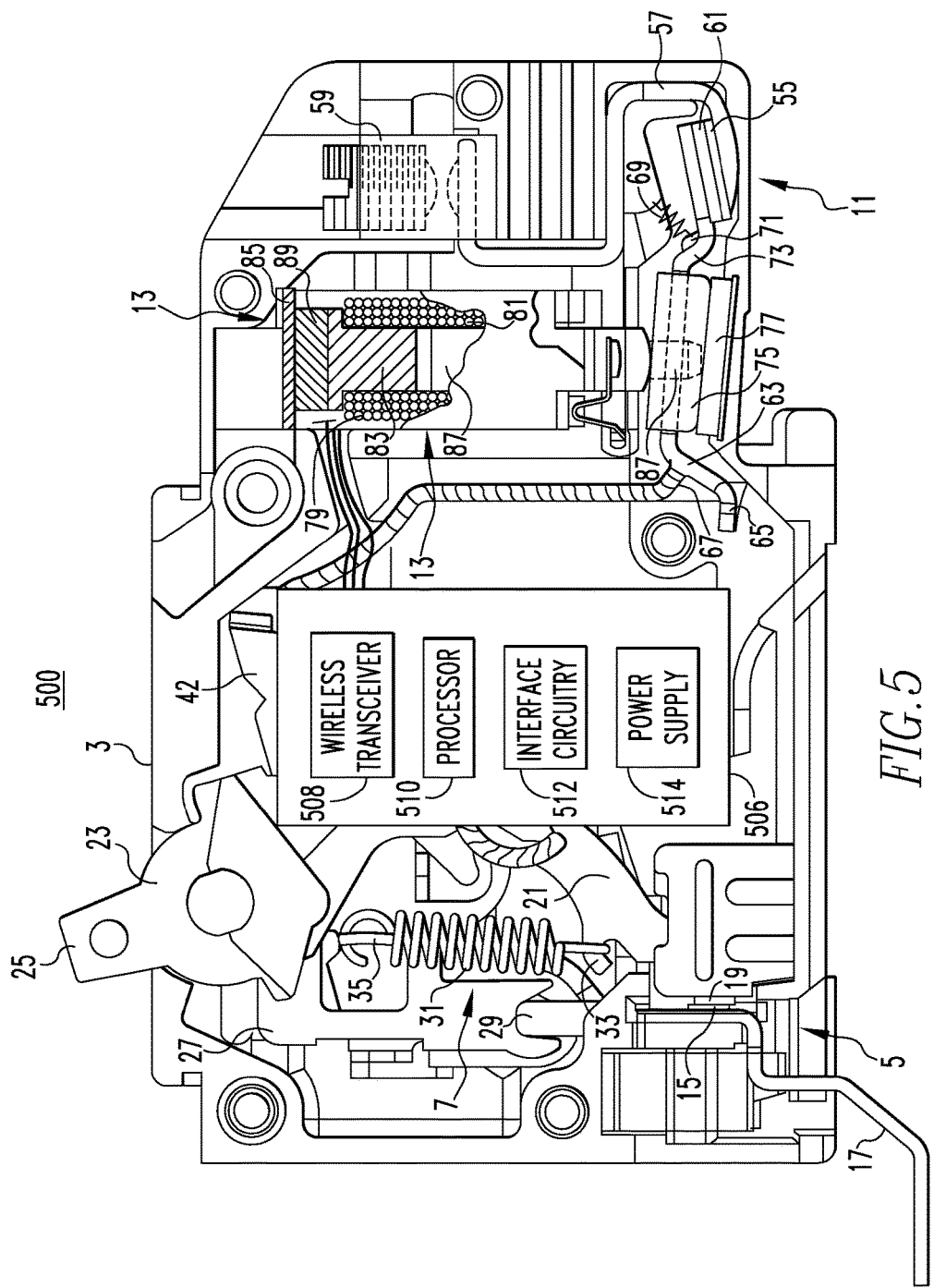

Referring to FIG. 5, a circuit breaker 500 in accordance with another example embodiment of the disclosed concept is shown. The circuit breaker 500 includes the line terminal 17 structured to electrically connect to line power and the load terminal 59 which is structured to electrically connect to a load (not shown). The circuit breaker 500 of FIG. 3, like the circuit breaker 1 of FIG. 1, includes the solenoid 13 which is operable to open or close secondary contacts 11. However, rather than receiving power signals via terminals 112 and 122, the circuit breaker 500 of FIG. 5 includes a remote operation circuit 506 including a wireless transceiver 508 structured to receive a wireless control signal. The wireless control signal may be any suitable type of wireless signal (e.g., without limitation, a short range wireless signal, a wi-fi signal, a Bluetooth signal, etc.). It is also contemplated that the control signal may be modulated in any suitable manner to communicate and/or carry information.

The remote operation circuit 506 also includes a processor 510, interface circuitry 512, and a power supply 514. The wireless transceiver 508 is structured to convert the wireless control signal to an electric control signal and output it to the processor 510. The processor 510 is structured to determine operation of the solenoid 13 based on the electric control signal. The processor 510 outputs a signal to the interface circuitry 512. Based on the signal from the processor 510, the interface circuitry 512 causes the solenoid 13 to operate to open or close the separable contacts 11 using power from the power supply 514.

In some embodiments of the disclosed concept, the processor 510 is also structured to determine whether one or more conditions are met and to only output the signal to the interface circuitry 512 to cause the solenoid 13 to operate to open or close when the one or more conditions are met. In one example embodiment, the circuit breaker 500 has associated identification information and the processor 510 only outputs the signal when the control signal also includes the identification information 500 of the circuit breaker. In this manner, one control signal can be used to open solenoids 13 on a selected circuit breaker or group of circuit breakers. In another example embodiment, the one or more conditions are based on characteristics such as, without limitation, a current between the line and the load, a voltage between the line and a neutral, and a type of the circuit breaker (e.g., without limitation, a lighting circuit breaker). With these types of conditions, the circuit breaker 500 uses a degree of logic to determine whether to trip, rather than always tripping in response to a control signal.

The power supply 514 is electrically connected to the conductive path between the line terminal 17 and the load terminal 59. The power supply 514 is structured to convert power flowing between the line and load terminals 17 and 59 (e.g., without limitation, the line power) to a suitable level and form for use in operating the solenoid 13. The power supply 514 provides this power to the interface circuitry 512 for use in operating the solenoid 13.

By employing the wireless transceiver 508 in the circuit breaker 500, wires are not needed to communicate control signals to the circuit breaker 500 which considerably reduces installation time. Furthermore, information in addition to the wireless control signal can be wirelessly received by the wireless transceiver 508. Additionally, it is contemplated that the wireless transceiver 508 can also wirelessly transmit information such as, without limitation, diagnostic or status information corresponding to the circuit breaker 500. It is further contemplated that the remote operation circuits 306,406 of FIGS. 3 and 4 may also be configured to transmit such information corresponding to the circuit breaker either electrically or optically.

Figure 6:
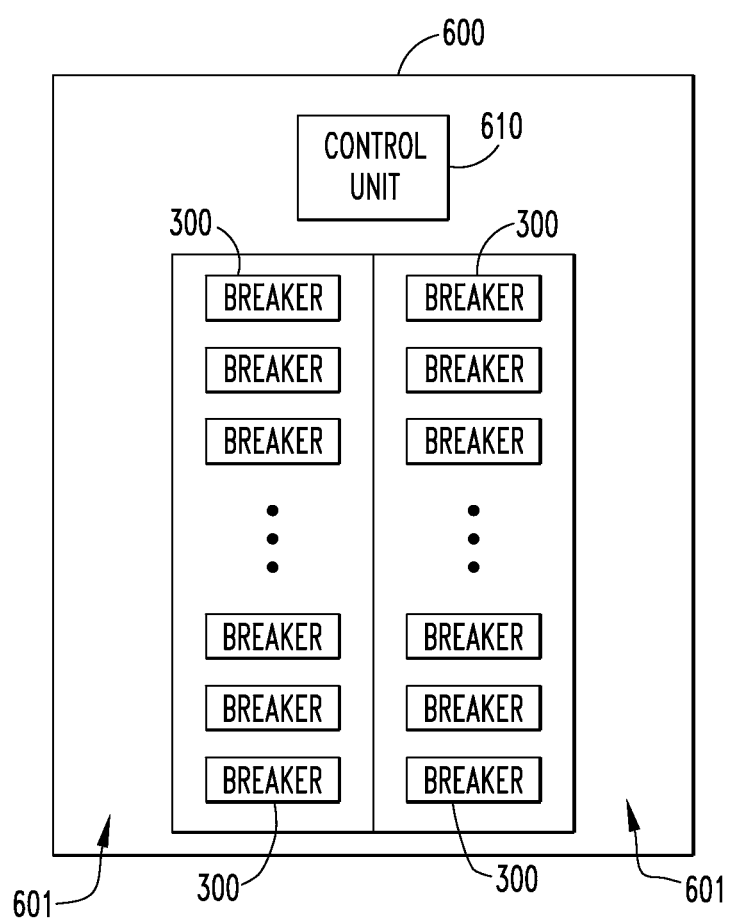
FIGS. 6-8 are schematic diagrams of circuit breaker panels in accordance with example embodiments of the disclosed concept.

Referring to FIG. 6 a circuit breaker panel 600 in accordance with an example embodiment of the disclosed concept is shown. The panel 600 is similar to the panel 200 of FIG. 2. However, the panel 600 includes two columns of the circuit breakers 300 of FIG. 3 rather than the circuit breakers 1 of FIG. 1. Although not shown in FIG. 6, the panel 600 may include the circuit breakers 400 of FIG. 4 or the circuit breakers 500 of FIG. 5 without departing from the scope of the disclosed concept.

Between the edge of a column of circuit breakers 300 and an outside edge of the panel 600 is a gutter space 601. As shown in FIG. 6, the gutter space 601 is empty. The circuit breakers 300 utilize the power supply 314 which converts power flowing between the line and load terminals 17 and 59 to operate the solenoid 13, so power converters 202 and control bus 206 (see FIG. 2) are not needed. As such, the gutter space 601 may remain empty or may be utilized for other equipment.

The panel 600 also includes a control unit 610. The control unit 610 generates the control signals for transmission to the circuit breakers 300. If the panel 600 includes the circuit breakers 400 of FIG. 4, the control unit 610 may generate the optical control signals for transmission to the circuit breakers 400. If the panel 600 includes the circuit breakers 500 of FIG. 5, the control unit 610 may generate the wireless control signals for transmission to the circuit breakers 500.

Figure 7:
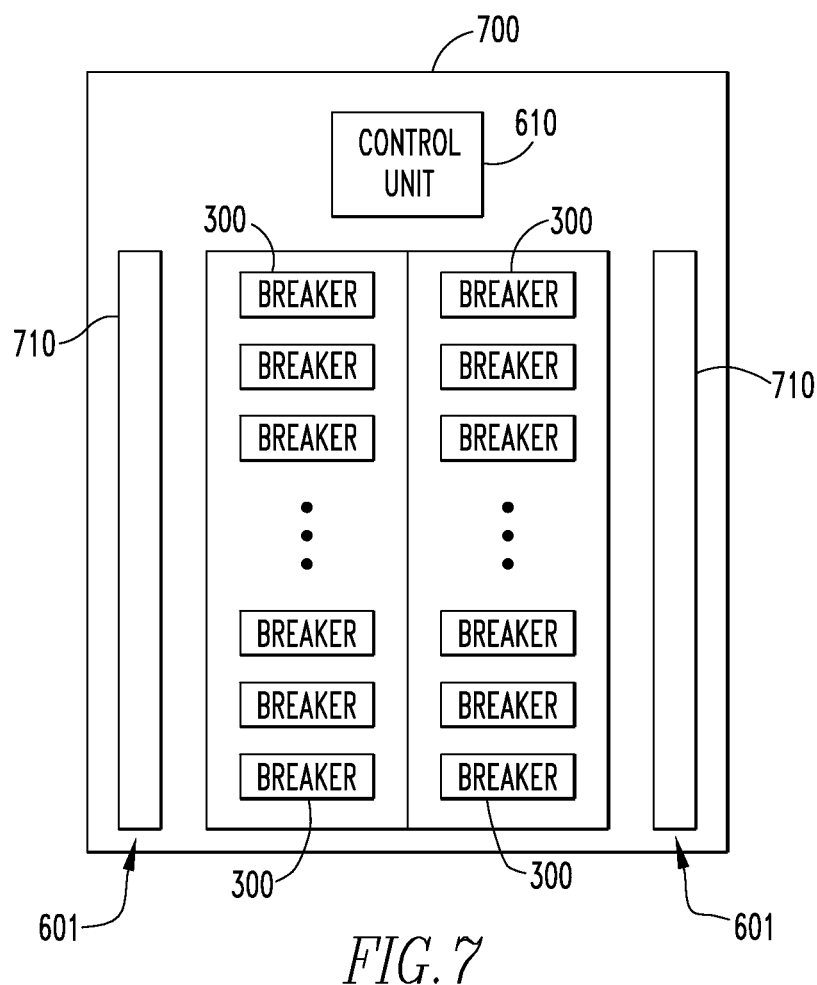

Referring to FIG. 7, a circuit breaker panel 700 in accordance with another example embodiment of the disclosed concept is shown. The panel 700 of FIG. 7 is similar to the panel 600 of FIG. 6. However, the panel 700 of FIG. 7 includes lighting units 710 installed in the gutter space 601. The lighting units 710 provide light for a technician servicing the panel 700 without the need to bring an external light source.

Figure 8:
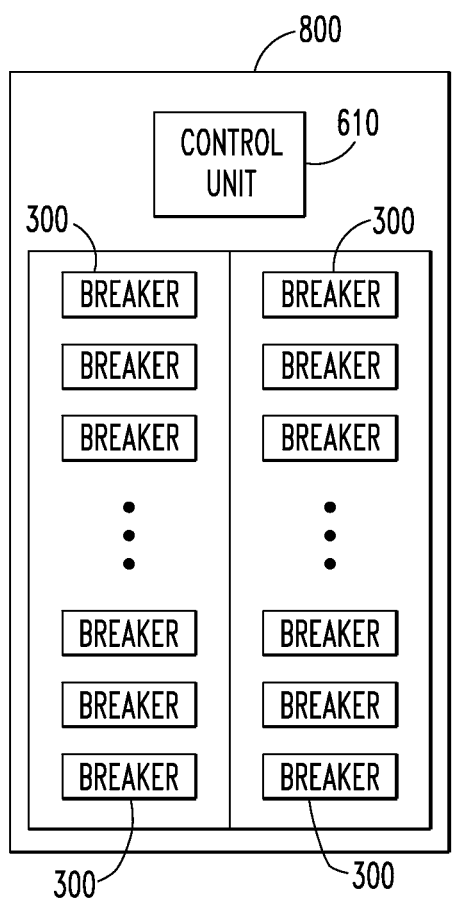

Referring to FIG. 8, a circuit breaker panel 800 in accordance with another example embodiment of the disclosed concept is shown. The panel 800 of FIG. 8 is similar to the panel 700 of FIG. 7. However, in the panel 800 of FIG. 8, the size of the panel 800 is reduced by eliminating gutter space between a column of circuit breakers 300 and the edge of the panel 800 so that the outside edges of the circuit breakers 300 are substantially adjacent to the edge of the panel 800. Reducing the size of the panel 800 allows the panel 800 to be installed in smaller spaces. Additionally, reducing the size of the panel 800 reduces the amount of material used in the panel 800, thus reducing its cost.

While example embodiments of the disclosed concept have been shown with respect to remotely operating secondary contacts, it is also contemplated that the disclosed concept may be employed to remotely operate primary contacts of a circuit breaker. Furthermore, while the example embodiments of the disclosed concept employ a solenoid as a mechanism to remotely open and close contacts, it is contemplated that other mechanisms (e.g., without limitation, a motor) may be employed to remotely open and close contacts.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker panel comprising:
   a control unit structured to generate a control signal; and
   a number of circuit breakers,
   wherein at least one of the circuit breakers includes first and second sets of separable contacts,
   wherein the at least one of the circuit breakers includes a first operating mechanism structured to open the first set of separable contacts in response to a fault condition and a second operating mechanism structured to open or close the second set of separable contacts in response to the control signal,
   wherein the at least one of the circuit breakers includes a thermal-magnetic trip device including an elongated bimetal and a magnetic yoke and being structured to actuate the first operating mechanism in response to the fault condition,
   wherein the at least one of the circuit breakers includes a remote operation circuit structured to receive the control signal and to control the second operating mechanism to open or close the second set of separable contacts based on said control signal,
   wherein the at least one of the circuit breakers is structured to electrically connect between a line and load and includes a power supply structured to convert power from the line and to use the converted power to open or close the second set of separable contacts,
   wherein the at least one of the circuit breakers includes a processor structured to determine whether one or more conditions are met in response to the at least one of the circuit breakers receiving the control signal and to control the second set of separable contacts to open or close if the one or more of the conditions are met, and
   wherein the one or more conditions are based on at least one of a current between the line and the load, a voltage between the line and a neutral, and a type of the at least one of the circuit breakers.

2. The circuit breaker panel of claim 1, wherein the panel includes a gutter space disposed between one of the circuit breakers and an edge of the panel.

3. The circuit breaker panel of claim 2, wherein a lighting unit is disposed in the gutter space.

4. The circuit breaker panel of claim 1, wherein an edge of the panel is substantially adjacent to an edge of one of the circuit breakers.

5. The circuit breaker panel of claim 1, wherein the control signal is a digital or analog signal.

6. The circuit breaker panel of claim 1, wherein the control signal is an optical control signal.

7. The circuit breaker panel of claim 1, wherein the control signal is a wireless control signal.

8. The circuit breaker panel of claim 1, wherein the at least one of the circuit breakers is structured to transmit information to the control unit.

9. The circuit breaker panel of claim 1, wherein the first set of separable contacts is a set of primary separable contacts and the second set of separable contacts is a set of secondary separable contacts.

10. The circuit breaker panel of claim 1, wherein the control signal is modulated to carry information.

11. The circuit breaker panel of claim 1, wherein the control unit is structured to broadcast the control signal to a plurality of the circuit breakers.

12. A circuit breaker panel comprising:
    a control unit structured to generate a control signal; and
    a number of circuit breakers,
    wherein at least one of the circuit breakers includes first and second sets of separable contacts and is structured to receive the control signal,
    wherein the at least one of the circuit breakers includes a first operating mechanism structured to open the first set of separable contacts in response to a fault condition and a second operating mechanism structured to open or close the second set of separable contacts in response to the control signal,
    wherein the at least one of the circuit breakers includes a thermal-magnetic trip device including an elongated bimetal and a magnetic yoke and being structured to actuate the first operating mechanism in response to the fault condition,
    wherein the at least one of the circuit breakers includes a remote operation circuit structured to receive the control signal and to control the second operating mechanism to open or close the second set of separable contacts based on said control signal,
    wherein the at least one of the circuit breakers includes a processor structured to determine whether one or more conditions are met in response to the at least one of the circuit breakers receiving the control signal and to control the second set of separable contacts to open or close if the one or more conditions are met, and wherein the one or more conditions are based on at least one of a current between the line and the load, a voltage between the line and a neutral, and a type of the at least one of the circuit breakers.

13. The circuit breaker panel of claim 12, wherein the at least one of the circuit breakers is structured to transmit the control signal to another one of the number of circuit breakers.

14. The circuit breaker panel of claim 12, wherein the control signal is a digital or analog signal.

15. The circuit breaker panel of claim 12, wherein the control signal is an optical control signal.

16. The circuit breaker panel of claim 12, wherein the control signal is a wireless control signal.

17. The circuit breaker panel of claim 12, wherein the at least one of the circuit breakers is structured to transmit information to the control unit.

18. The circuit breaker panel of claim 12, wherein the control unit is structured to broadcast the control signal to a plurality of the circuit breakers.

* * * * *